United States Patent
Wada

(10) Patent No.: US 11,343,423 B2
(45) Date of Patent: May 24, 2022

(54) FOCUS ADJUSTMENT APPARATUS, IMAGE CAPTURING APPARATUS, FOCUS ADJUSTMENT METHOD, AND STORAGE MEDIUM

(71) Applicant: CANON KABUSHIKI KAISHA, Tokyo (JP)

(72) Inventor: Akiko Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/239,444

(22) Filed: Apr. 23, 2021

(65) Prior Publication Data

US 2021/0337131 A1    Oct. 28, 2021

(30) Foreign Application Priority Data

Apr. 28, 2020   (JP) .............................. JP2020-079556

(51) Int. Cl.
*H04N 5/232*   (2006.01)
*G03B 13/36*   (2021.01)
*G02B 7/09*    (2021.01)

(52) U.S. Cl.
CPC ......... *H04N 5/232127* (2018.08); *G02B 7/09* (2013.01); *G03B 13/36* (2013.01); *H04N 5/232945* (2018.08)

(58) Field of Classification Search
CPC ....... H04N 5/232127; H04N 5/232945; G02B 7/09; G03B 13/36
USPC ...................................................... 348/346
See application file for complete search history.

(56) References Cited

U.S. PATENT DOCUMENTS

| | | | | |
|---|---|---|---|---|
| 7,573,505 | B2* | 8/2009 | Kawaguchi | H04N 5/23219 348/222.1 |
| 8,577,098 | B2* | 11/2013 | Ito | G06F 16/5838 382/118 |
| 8,682,040 | B2* | 3/2014 | Tsuji | H04N 5/23219 382/118 |
| 8,818,055 | B2* | 8/2014 | Tsuji | H04N 5/232945 382/118 |
| 8,823,864 | B2* | 9/2014 | Suzuki | H04N 5/232127 348/346 |
| 9,177,194 | B2* | 11/2015 | Sundstrom | G06F 16/5838 |
| 9,177,203 | B2* | 11/2015 | Kurokawa | G06K 9/00228 |
| 10,200,590 | B2* | 2/2019 | Yamazaki | H04N 5/232945 |

(Continued)

FOREIGN PATENT DOCUMENTS

JP    2010141616 A    6/2010

*Primary Examiner* — Pritham D Prabhakher
(74) *Attorney, Agent, or Firm* — Canon U.S.A., Inc. IP Division

(57) ABSTRACT

There is provided a focus adjustment apparatus. A selection unit repeatedly executes selection processing for selecting a main subject from one or more subjects included in a shooting range based on an autofocus (AF) setting. A focus adjustment unit performs focus adjustment on a target position determined based on the selected main subject. A change unit changes the AF setting. In a case where the AF setting is changed after a previous execution of selection processing, the selection unit determines whether to execute selection processing based on a main subject selected in the previous execution of selection processing or whether to execute the selection processing independently of the main subject selected in the previous execution of selection processing according to a change content of the AF setting.

16 Claims, 13 Drawing Sheets

(56) References Cited

U.S. PATENT DOCUMENTS

| | | | |
|---|---|---|---|
| 10,911,663 B2* | 2/2021 | Sato | H04N 5/23296 |
| 2008/0199056 A1* | 8/2008 | Tokuse | G06K 9/00295 |
| | | | 382/118 |
| 2010/0150450 A1* | 6/2010 | Tsuji | H04N 5/232945 |
| | | | 382/195 |
| 2011/0019066 A1* | 1/2011 | Takano | H04N 5/23219 |
| | | | 348/345 |
| 2011/0129121 A1* | 6/2011 | Corcoran | G06K 9/00281 |
| | | | 382/103 |
| 2012/0120269 A1* | 5/2012 | Capata | G06K 9/6257 |
| | | | 348/222.1 |
| 2013/0322695 A1* | 12/2013 | Tsuji | G06K 9/00228 |
| | | | 382/103 |
| 2016/0173759 A1* | 6/2016 | Nakamura | H04N 5/232945 |
| | | | 348/222.1 |
| 2017/0034421 A1* | 2/2017 | Yamazaki | H04N 5/232127 |
| 2018/0063414 A1* | 3/2018 | Hongu | G02B 7/285 |
| 2019/0116311 A1* | 4/2019 | Sato | H04N 5/23216 |
| 2020/0106953 A1* | 4/2020 | Suzuki | H04N 5/23212 |
| 2020/0236291 A1* | 7/2020 | Hoshino | H04N 5/232 |

\* cited by examiner

FOCUS ADJUSTMENT APPARATUS, IMAGE CAPTURING APPARATUS, FOCUS ADJUSTMENT METHOD, AND STORAGE MEDIUM

BACKGROUND

Field of the Disclosure

The present disclosure relates to a focus adjustment apparatus, an image capturing apparatus, a focus adjustment method, and a storage medium.

Description of the Related Art

Image processing techniques for automatically detecting a specific subject pattern (e.g., face region of a person) from an image are known. Image capturing apparatuses such as digital cameras detect a specific subject region from a shot image, and optimize AF and AE (focus and exposure) with the detected region as a control target. Thus, being able to appropriately select a suitable subject (main subject) as a target for performing AF and AE control in line with the intention of the user is a very important element determining the image quality of shot images.

Japanese Patent Laid-Open No. 2010-141616 proposes a technique that involves calculating a priority of each detected subject based on the position or size or most recent priority of the subject, and determining the main subject. Thereby, Japanese Patent Laid-Open No. 2010-141616 realizes more appropriate main subject selection that is in line with the intention of the user.

The user is able to switch the settings (hereinafter, autofocus (AF) settings) for when implementing AF control so as to facilitate AF tracking of the intended main subject. Examples of AF settings include an AF range setting of a range for performing AF control within the screen, a pupil AF setting for implementing AF control targeting the pupil of the subject, a servo AF setting for implementing continuous AF control during shooting, and a priority subject setting for designating the type of subject to prioritize as an AF target.

However, with the technology of Japanese Patent Laid-Open No. 2010-141616, there is a possibility of not being able to appropriately select the main subject in line with the intention of the user in the case where the AF settings are changed.

SUMMARY

The present disclosure has been made in view of such situations, and provides a technology for determining, according to the change content of AF settings, whether to select the main subject this time based on the main subject last time or whether to select the main subject this time independently of the main subject last time.

According to a first aspect of the present disclosure, a focus adjustment apparatus comprising at least one processor is provided. The processor functions as: a selection unit configured to repeatedly execute a selection processing for selecting a main subject from one or more subjects included in a shooting range based on an autofocus (AF) setting; a focus adjustment unit configured to perform a focus adjustment on a target position determined based on the selected main subject; and a change unit configured to change the AF setting. In a case where the AF setting is changed after a previous execution of selection processing, the selection unit determines whether to execute selection processing based on a main subject selected in the previous execution of selection processing or whether to execute the selection processing independently of the main subject selected in the previous execution of selection processing according to a change content of the AF setting.

According to a second aspect of the present disclosure, the image capturing apparatus provided above may further includes an image sensor.

According to a third aspect of the present disclosure, a focus adjustment method executed by a focus adjustment apparatus is provided. The method includes repeatedly executing selection processing for selecting a main subject from one or more subjects included in a shooting range based on an autofocus (AF) setting; performing focus adjustment on a target position determined based on the selected main subject; and changing the AF setting. In a case where the AF setting is changed after a previous execution of selection processing, determining whether to execute selection processing this time based on the main subject selected in the previous execution of selection processing or whether to execute the selection processing independently of the main subject selected in the previous execution of selection processing according to a change content of the AF setting.

According to a fourth aspect of the present disclosure, a non-transitory computer-readable storage medium which stores a program for causing a computer to execute a focus adjustment method is provided. The method comprises: repeatedly executing selection processing for selecting a main subject from one or more subjects included in a shooting range based on an autofocus (AF) setting; performing focus adjustment on a target position determined based on the selected main subject; and changing the AF setting. In a case where the AF setting is changed after a previous execution of selection processing, determining whether to execute selection processing based on a main subject selected in the previous execution of selection processing or whether to execute the selection processing independently of the main subject selected in the previous execution of selection processing, according to a change content of the AF setting.

Further features of the present invention will become apparent from the following description of exemplary embodiments with reference to the attached drawings.

DESCRIPTION OF THE EMBODIMENTS

Figure 1A:
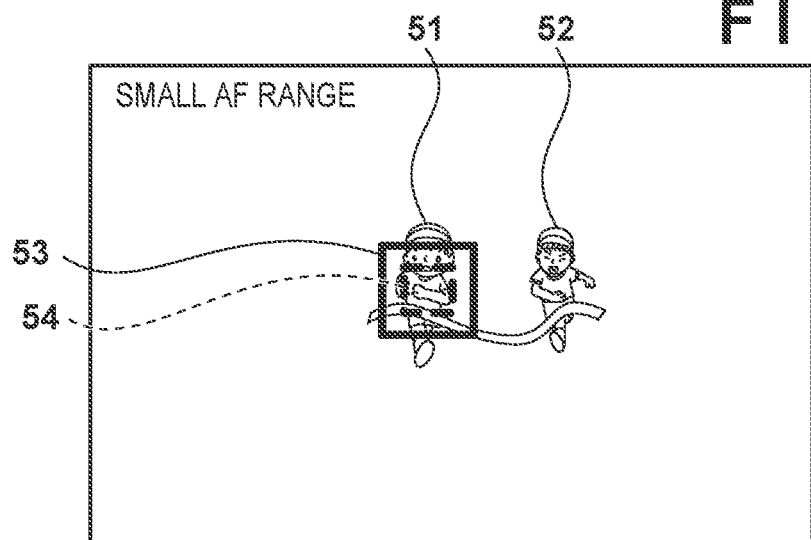
FIGS. 1A to 1C are diagrams showing an issue in selecting an intended main subject caused by changing the AF setting.
Figure 1B:
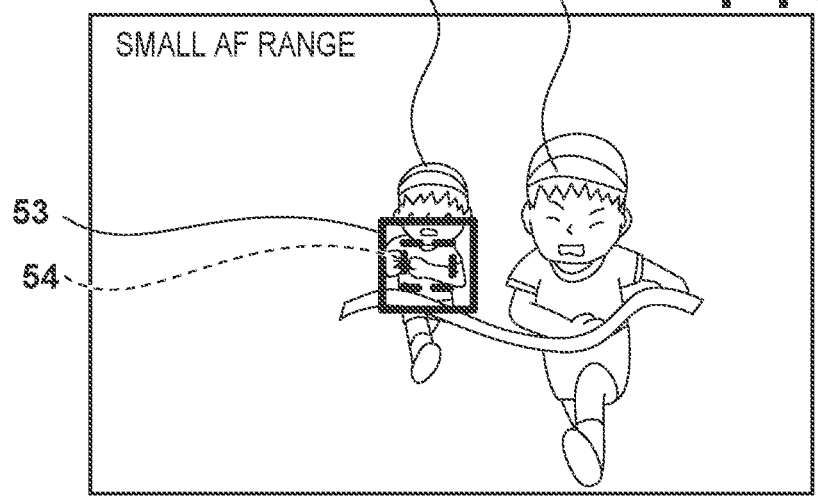
Figure 1C:
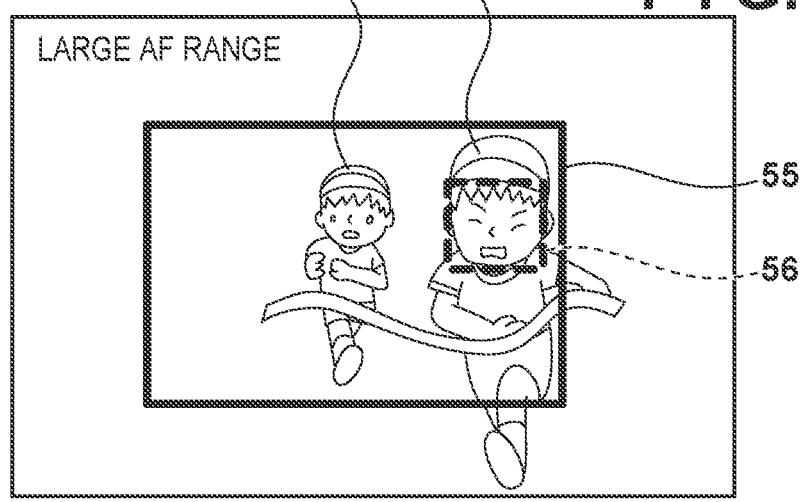

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. In the case where the AF settings are changed such that the AF range is enlarged will be described, with reference to FIGS. 1A to 1C. FIGS. 1A to 1C show a situation where a person 51 and a person 52 are included within the shooting screen, and the user wants to set the person 51 as the main subject. As shown in FIG. 1A, in the case where the user sets a small AF range 53 shown with a solid line, a whole body portion 54 of the person 51 shown with a dotted line can be selected as the main subject, by framing the person 51 so as to fit within the AF range 53. AF control on the subject that suits the intent of the user is thereby possible. Here, as shown in FIG. 1B, there are cases where the person 51 approaches and the subject becomes larger, requiring focus accuracy on the face. In this case, as shown in FIG. 1C, the face can now be selected as the main subject by switching to a large AF range 55 shown with a solid line. Since the person 52 will be included within the AF range 55 as a result of increasing the AF range, however, there is also a possibility that a face 56 of the person 52 shown with a dotted line will be selected as the main subject, and that this will not suit the intent of the user. On the other hand, there is a possibility that the user wants to select the face 56 of the person 52 as a new main subject, depending on the change content of the AF settings.

First Embodiment

Figure 2:
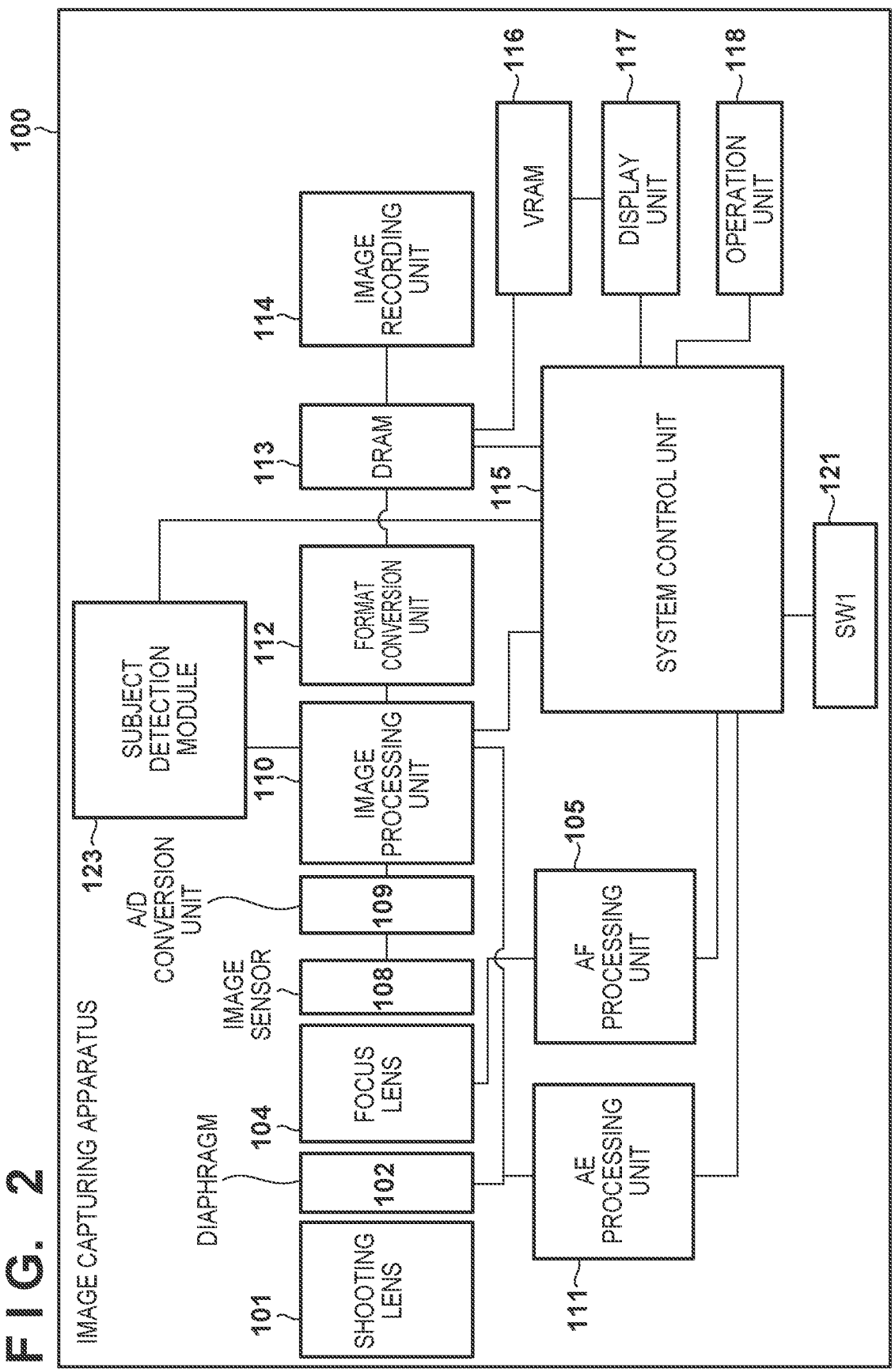
FIG. 2 is a block diagram showing a configuration of an image capturing apparatus 100 that includes a focus adjustment apparatus.

FIG. 2 is a block diagram showing the configuration of an image capturing apparatus 100 that includes a focus adjustment apparatus. In FIG. 2, reference numeral 101 denotes a shooting lens that includes a zoom mechanism. Reference numeral 102 denotes a diaphragm for controlling the amount of incidence light and adjusting the depth of field. Reference numeral 104 denotes a focus lens for focusing on an image sensor 108 described later. Reference numeral 105 denotes an AF processing unit (autofocus processing unit) that includes a drive mechanism of the focus lens 104. Reference numeral 108 denotes an image sensor that includes a photoelectric conversion unit for converting light reflected by a subject into electrical signals. Reference numeral 109 denotes an A/D conversion unit that includes a CDS (correlated double sampling) circuit for removing output noise of the image sensor 108 and a nonlinear amplification circuit for performing processing before A/D conversion.

Reference numeral 110 is an image processing unit that includes a luminance calculation unit for calculating the luminance of the subject based on the output signal of the A/D conversion unit 109 and an extraction unit for extracting the signal component of a specific frequency band from the output signal of the luminance calculation unit. Reference numeral 111 denotes an AE processing unit (exposure processing unit). Reference numeral 112 denotes a format conversion unit. Reference numeral 113 denotes a high-speed built-in memory (DRAM). The DRAM 113 is used as a high-speed buffer for temporary image storage. Also, the DRAM 113 is used as a work memory for compression/decompression of images and other such use applications. Reference numeral 114 denotes an image recording unit that includes a recording medium such as a memory card and an interface thereof.

Reference numeral 115 denotes a system control unit (CPU) for controlling the operations of the entire image capturing apparatus 100. Reference numeral 116 denotes an image display memory (VRAM). Reference numeral 117 denotes a display unit for performing display such as image display, operation support display, and camera state display. The display unit 117 displays the shot image and AF range at the time of shooting. The system control unit 115 is able to display a screen for switching AF settings on the display unit 117, in order to enable switching of AF settings by the user.

Reference numeral 118 denotes an operation unit for externally operating the image capturing apparatus 100. The operation unit 118 includes, for example, a menu switch for configuring various types of settings such as setting of the shooting function of the image capturing apparatus 100 and settings for image playback, a zoom lever for instructing zoom operation of the shooting lens 101, and an operational mode changeover switch for switching the shooting mode and the playback mode. There are also cases where the user, when switching AF settings, switches the AF settings by operating the operation unit 118, while the shot image and AF range are displayed on the display unit 117.

Reference numeral 121 denotes a shooting standby switch (SW1) for instructing the image capturing apparatus 100 to perform shooting standby operations such as AF and AE. Upon the SW1 121 being operated, control for confirming the focus position for shooting of the focus lens 104 is performed.

Reference numeral 123 denotes a subject detection module. The subject detection module 123 detects various types of subjects, using image signals processed by the image processing unit 110, and acquires subject information (type, position, size, reliability, distance, etc.) of each of one or more detected subjects. Also, the subject detection module 123 determines (selects) a main subject to undergo processing by the AF processing unit 105 and AE processing unit 111. The subject detection module 123 determines (selects)

the main subject from the one or more detected subjects, based on the subject information (type, position, size, reliability, distance, etc.).

Next, overall operations by the image capturing apparatus 100 will be described, with reference to FIG. 3. The processing of this flowchart is repeatedly executed in a predetermined cycle.

In step S301, the subject detection module 123 acquires an image signal from the image processing unit 110. In step S302, the subject detection module 123 performs subject detection processing using the image signal acquired in step S301. Subjects targeted for detection include persons, animals and subjects with marked color luminance, for example. Subject detection targeting subjects with marked color luminance will be called "object detection". The subject detection module 123 acquires subject information (type, position, size, reliability, distance, etc.) of each of the one or more detected subjects.

In step S303, the system control unit 115 determines whether the AF settings have been changed after the execution of main subject selection processing last time (step S304 or step S305). If the AF settings have not been changed, the processing step advances to step S304, and if the AF settings have been changed, the processing step advances to step S305. Changeable setting items of the AF settings include, for example, a setting item (AF range setting) for prescribing a target range (AF range) of the main subject selection processing within the shooting range, and a setting item (pupil AF setting) relating to AF control targeting the pupil of a subject. Other examples include a setting item (servo AF setting) relating to continuous AF control during shooting, and a setting item (priority subject setting) for setting the type of subject (priority subject type) to be preferentially selected as the main subject.

In step S304, the subject detection module 123 executes basic main subject selection processing. FIGS. 4A to 4D are conceptual diagrams of the basic main subject selection processing. In the basic main subject selection processing, the subject detection module 123 calculates the priorities of subjects based on subject information and selects a main subject.

Figure 4A:
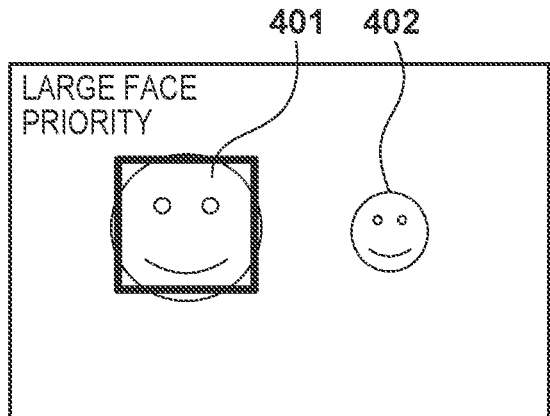
FIGS. 4A to 4D are conceptual diagrams of basic main subject selection processing.
Figure 4B:
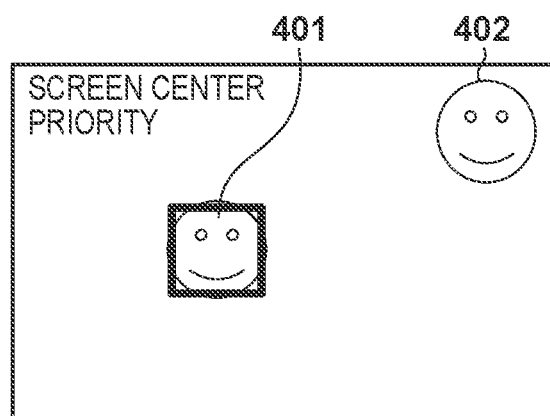
Figure 4C:
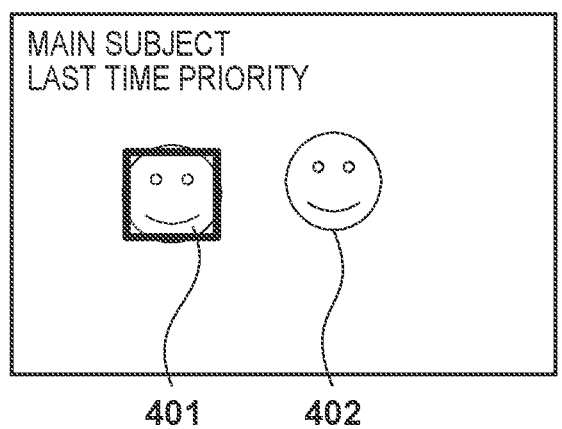
Figure 4D:
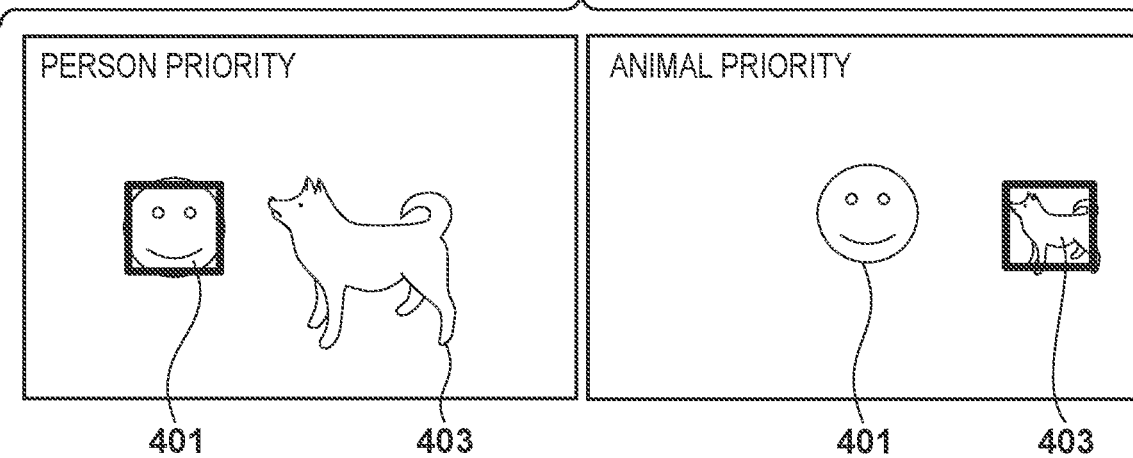

For example, in the case where a subject whose size is larger has a higher priority as the main subject, as shown in FIG. 4A, the subject detection module 123 compares a person 401 and a person 402, and raises the priority of the person 401 whose face size is larger. Also, in the case where a subject that is closer to the center of the screen has a higher priority as the main subject, as shown in FIG. 4B, the subject detection module 123 compares the person 401 and the person 402, and raises the priority of the person 401 who is closer to the center of the screen. Also, consider the case where the subject that was selected as the main subject at the time of the main subject selection last time has a higher priority as the main subject, as shown in FIG. 4C. In this case, if the person 401 was selected as the main subject last time, the subject detection module 123 raises the priority of the person 401. Also, in the case where there is a setting item (priority subject setting) for setting the type of subject (priority subject type) to be preferentially selected as the main subject among the AF settings, the subject detection module 123 raises the priority as the main subject of subjects corresponding to the priority subject type set by the user. In the case where person is set as the priority subject type, as shown on the left side of FIG. 4D, the subject detection module 123 raises the priority of the person 401 corresponding to the priority subject type, out of the person 401 and an animal 403. Similarly, in the case where animal is set as the priority subject type, as shown on the right side of FIG. 4D, the subject detection module 123 raises the priority of the animal 403 corresponding to the priority subject type, out of the person 401 and the animal 403.

By adopting this configuration, the subject detection module 123 calculates various types of priorities according to factors such as the size and position of subjects, the main subject last time, and the type of subjects. The subject detection module 123 then calculates the final priority of each subject by taking the weighted average of the numerical values of the various types of calculated priorities, and selects the subject with the highest priority as the main subject. Thereby, a subject most suitable as the shooting target can be selected as the main subject with various viewpoints taken into consideration, such as the size and position of subjects, the main subject last time, and the type of subject.

Also, apart from the above, priorities may be calculated according to reliability, subject distance and other such information that are obtained as subject information.

Returning to FIG. 3, in step S305, the subject detection module 123 performs main subject selection processing for when the AF settings have been changed. Details of the main subject selection processing for when the AF settings have been changed will be described later with reference to FIG. 5.

In step S306, the system control unit 115 determines whether a main subject has been selected in step S304 or step S305. If a main subject has been selected, the processing step advances to step S308. If a main subject has not been selected (e.g., in cases such as where subject detection failed), the processing step advances to step S307.

In step S307, the AF processing unit 105 determines the AF control region. For example, the AF processing unit 105 determines, as the AF control region, a region in the vicinity of both the center of the AF range and the close-up position, a region having high continuity with the AF position last time (target position of focus adjustment), or other such regions, according to the camera settings, scene judgment result, and the like.

In step S308, the AF processing unit 105 performs focus adjustment on the AF position (target position of focus adjustment) that is determined based on the main subject determined in step S304 or step S305 or the AF control region determined in step S307. Also, the AE processing unit 111 performs AE processing based on the main subject determined in step S304 or step S305 or the AF control region determined in step S307. Note that in the case where AF is already locked by one shot AF (described in detail later), the AF processing in step S308 can be omitted.

Next, details of the main subject selection processing (step S305 of FIG. 3) for when the AF settings have been changed will be described, with reference to FIG. 5. The main subject selection processing for when the AF settings have been changed is performed according to the change content of the AF settings (relationship of setting contents before and after change of changed setting item, etc.). Note that the system control unit 115 is able to perform display control for controlling whether to display a shooting screen (image of shooting range) on the display unit 117.

In step S501, the subject detection module 123 determines whether the AF settings were switched (changed) in a state where the shooting screen (image of shooting range) is displayed on the display unit 117. If the AF settings were switched in a state where the shooting screen is displayed on the display unit 117, the processing step advances to step S502, and if that is not the case, the processing step advances to step S503.

The case where the AF settings are switched in a state where the shooting screen is displayed on the display unit 117 is where, for example, the user switches to the setting contents of AF settings registered in advance by operating the operation unit 118 while checking the shooting scene. The case where the AF settings are switched in a state where the shooting screen is not displayed on the display unit 117 is where, for example, the user switches the AF settings after displaying a menu for switching the AF settings on the display unit 117.

In step S502, the subject detection module 123 switches the selection method of the main subject, according to the change content of the AF settings. For example, if the AF settings are changed so as to reduce the AF range (target range of the main subject selection processing within the shooting range) or if the priority subject type is changed due to the priority subject setting being changed, the processing step advances to step S503. Also, if the AF settings are changed so as to enlarge the AF range (target range of the main subject selection processing within the shooting range), the processing step advances to step S504. Also, if the pupil AF setting is enabled or disabled or if the servo AF setting is enabled, the processing step advances to step S505. In the case of other change content, the processing step likewise advances to one of steps S503 to S505, according to the nature of the change content.

Note that the priority subject type is changed in the case where the priority subject setting is changed. Also, the priority subject type is changed to pupil in the case where the pupil AF setting is enabled, and the priority subject type returns to the state before the pupil AF setting was enabled in the case where the pupil AF setting is disabled. Accordingly, this means that although the processing step transitions from step S502 to step S503 as a rule in the case where the priority subject type is changed at the conditional branch of step S502, the processing step changes from step S502 to step S505 if the priority subject type set before or after the change is pupil.

Next, the processing of step S503 will be described. As described above, the processing of step S503 is executed in cases such as where the AF range was reduced or the priority subject type is changed due to the priority subject setting being changed. In these cases, there is a high possibility that the main subject last time was not in line with the intention of the user. In view of this, in step S503, the subject detection module 123 selects the main subject this time independently of the main subject last time. The selection processing executed here is generally similar to the basic main subject selection processing described in step S304 of FIG. 3, for example, but the setting of priorities based on the main subject last time described with reference to FIG. 4C is not performed.

Specific examples of the main subject selection processing in the case where the AF range is reduced will be described, with reference to FIGS. 6A and 6B. As for the intention of the user in the case where the AF range is reduced, a situation is envisaged in which the main subject selected by the image capturing apparatus 100 within a large AF range cannot be appropriately focused, and thus the user wants to appropriately refocus by limiting the AF range to a narrow range.

Figure 6A:
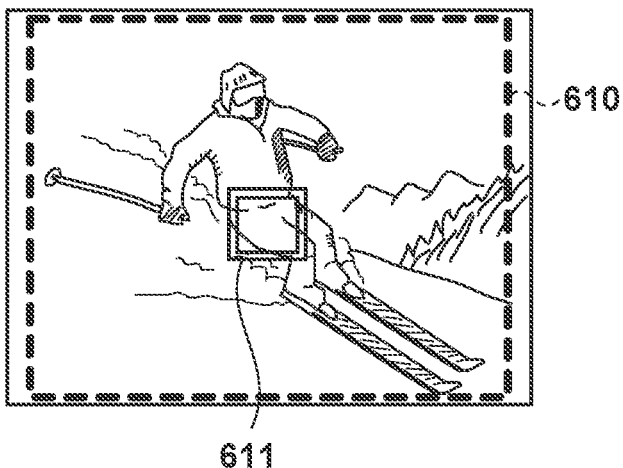
FIGS. 6A and 6B are diagrams illustrating specific examples of main subject selection processing in the case where the AF range is reduced.

For example, in the case where an AF range 610 of the entire region shown with a dashed line is set, as shown in FIG. 6A, subject detection may not be stable due to factors such as the vigorous movement of the person or the presence of the hat and goggles. Focus may conversely be adversely affected when AF control is performed in such situations. Thus, the user may attempt to refocus by switching to a small AF range 611 in the vicinity of the body of the person.

Figure 6B:
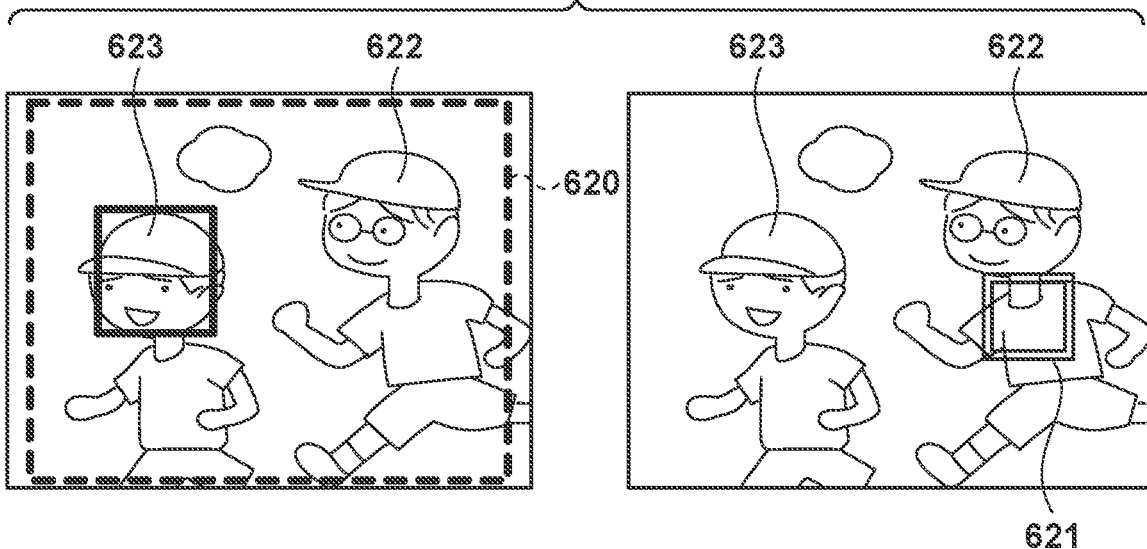

The main subject selection result not being as intended by the user, in the case where there are a plurality of subjects within the screen in a situation where a large AF range 620 is set, as shown on the left side of FIG. 6B, and the user thus intending to switch the AF range a small range is also envisaged. The left side of FIG. 6B shows the case where the AF range 620 shown with a dashed line is set with the intention of sequentially shooting the runners as they run. However, despite the user envisaging a person 622 as the main subject, a person 623 who is slightly closer to the center of the screen is selected as the main subject. In view of this, part of the body of the person 622 that the user is targeting can be selected as the main subject, by switching to a small AF range 621 shown with double lines, as shown on the right side of FIG. 6B.

Next, a specific example of the main subject selection processing in the case where the priority subject type is changed due to the priority subject setting being changed will be described, with reference to FIG. 6C. A situation where the user intends to prioritize a different type of subject from the type before the AF settings were switched is assumed in this case. Thus, similarly in this case, the main subject selection is performed without taking into consideration the main subject selected before the AF settings were switched.

Figure 6C:
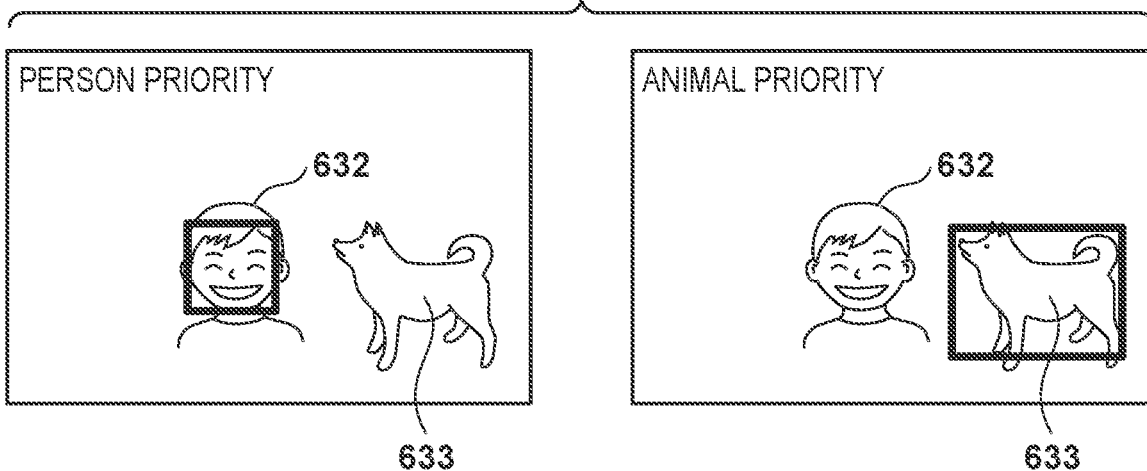
FIG. 6C is a diagram illustrating a specific example of main subject selection processing in the case where a priority subject type is changed due to a priority subject setting being changed.

FIG. 6C shows a scene in which the priority subject type is switched from person to animal. On the left side of FIG. 6C, the priority subject type is person, and a person 632 enclosed by a solid line is preferentially chosen as the main subject. In contrast, in the case where the user switches the priority subject type to animal, as shown on the right side of FIG. 6C, it is assumed that the intent of the user is to switch the shooting target from a person to an animal. Thus, an animal 633 enclosed with a solid line is selected as the main subject, without taking into consideration the person 632 who was the main subject in the previous AF settings.

Furthermore, the processing of step S503 is also executed in the case where the AF settings are switched in a state where the shooting screen is not displayed on the display unit 117. In this case, since the user is unable to check for changes in subjects while switching the AF settings, it is assumed that the user is not tracking the subjects and has switched the AF settings following the scene being switched. Thus, it is assumed that the user is thinking not to take into consideration the situation of the main subject selected before the switch. Accordingly, in this case, the main subject this time is selected independently of the main subject last time, regardless of the change content of the AF settings.

Next, the processing of step S504 will be described. As described above, the processing of step S504 is executed in cases such as where the AF settings are changed so as to enlarge the AF range. In step S504, the subject detection module 123 selects the main subject this time based on the main subject last time. For example, the subject detection module 123 selects the main subject this time based on the AF position last time (target position of focus adjustment) determined based on the main subject last time. Details of the main subject selection processing in step S504 will be described later with reference to FIGS. 8 to 11.

Next, the processing of step S505 will be described. As described above, the processing of step S505 is executed in cases such as where the pupil AF setting is enabled or disabled or where the servo AF setting is enabled. In these cases there is a high possibility that the user intends to continue tracking the same subject before and after changing the AF settings. In view of this, in step S505, the subject detection module 123 selects the main subject this time based on the main subject last time. For example, the subject detection module 123 preferentially selects a subject related to the main subject last time as the main subject this time.

Figure 7A:
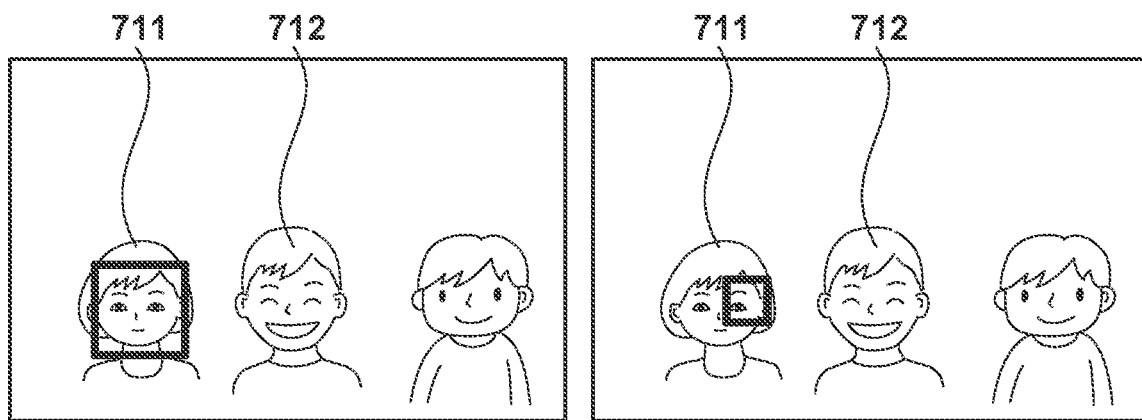
FIG. 7A is a diagram illustrating a specific example of main subject selection processing in the case where a pupil AF setting is enabled or disabled.

A specific example of the main subject selection processing in the case where the pupil AF setting is enabled or disabled will be described, with reference to FIG. 7A. There are user needs that involve wanting to focus on the pupil of the same subject as the main subject last time, in the case where the pupil AF setting is enabled. On the left side of FIG. 7A, the pupil AF setting is disabled, and the face of a person 711 shown by a rectangular frame with a solid line is the main subject. On the right side of FIG. 7A, the pupil AF setting is enabled, with the pupil of the person 711 who was the main subject selected before the AF settings were switched being selected as the main subject, rather than the pupil of a person 712 who is in the center of the screen. Main subject selection that suits the intention of the user is thereby realized. Thereafter, if the pupil AF setting is disabled, the person 711 (subject related to the pupil that is the subject selected as the main subject in FIG. 7B) is selected again, as shown on the left side of FIG. 7A.

Figure 7B:
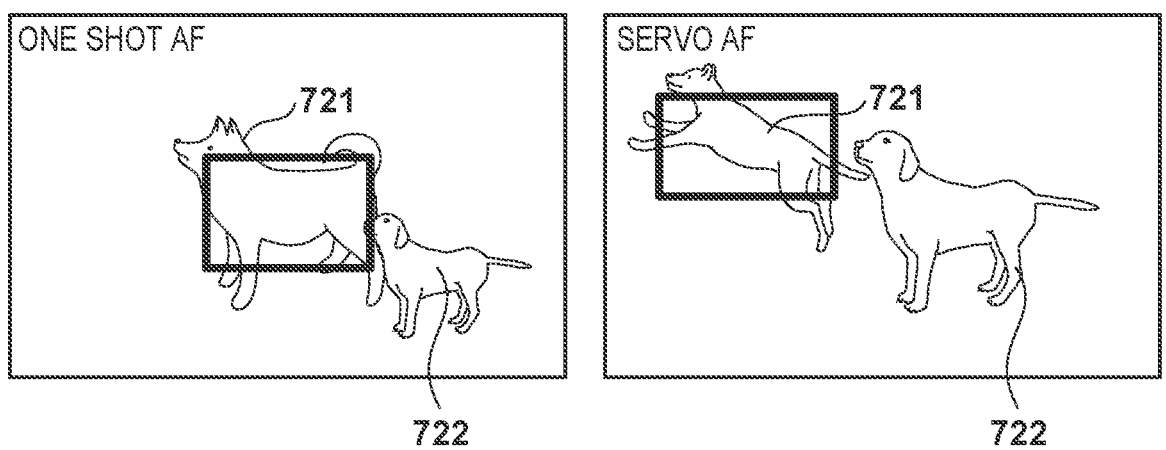
FIG. 7B is a diagram illustrating main subject selection processing in the case where a servo AF setting is enabled.

Next, the main subject selection processing in the case where the servo AF setting is enabled will be described, with reference to FIG. 7B. There are user needs that involve wanting to enable the servo AF setting according to the movement of the subject while maintaining the same subject as the main subject. On the left side of FIG. 7B, an animal 721 shown by a rectangular frame with a solid line is stationary, and thus the servo AF setting is disabled, and one shot AF (AF in which focus adjustment is performed only once in response to one focus adjustment instruction by the user) is performed. On the other hand, on the right side of FIG. 7B, the animal 721 shown by a rectangular frame with a solid line has started moving, and thus the servo AF setting is enabled by the user, and servo AF (AF in which focus adjustment is continuously repeated in response to one focus adjustment instruction by the user) is performed. In the case where the servo AF setting is enabled in this way, it is assumed that continuing to select the same subject as the main subject suits the intention of the user. Thus, the animal 721 that was the main subject before the AF settings were switched is selected as the main subject, rather than an animal 722 that is larger and closer to the center of the screen.

Next, details of the main subject selection processing that is based on the AF position last time in step S504 of FIG. 5 will be described, with reference to FIGS. 8 to 11. Main subject selection processing that is based on the AF position last time is executed in cases such as where the AF settings are changed so as to enlarge the AF range. In this case, there is conceivably a high possibility that the main subject intended by the user is in proximity to the AF position last time. In view of this, the subject detection module 123 is configured to be able to implement AF control on a main subject that is in line with the intention of the user, by selecting a main subject in proximity to the AF position last time.

Figure 9:
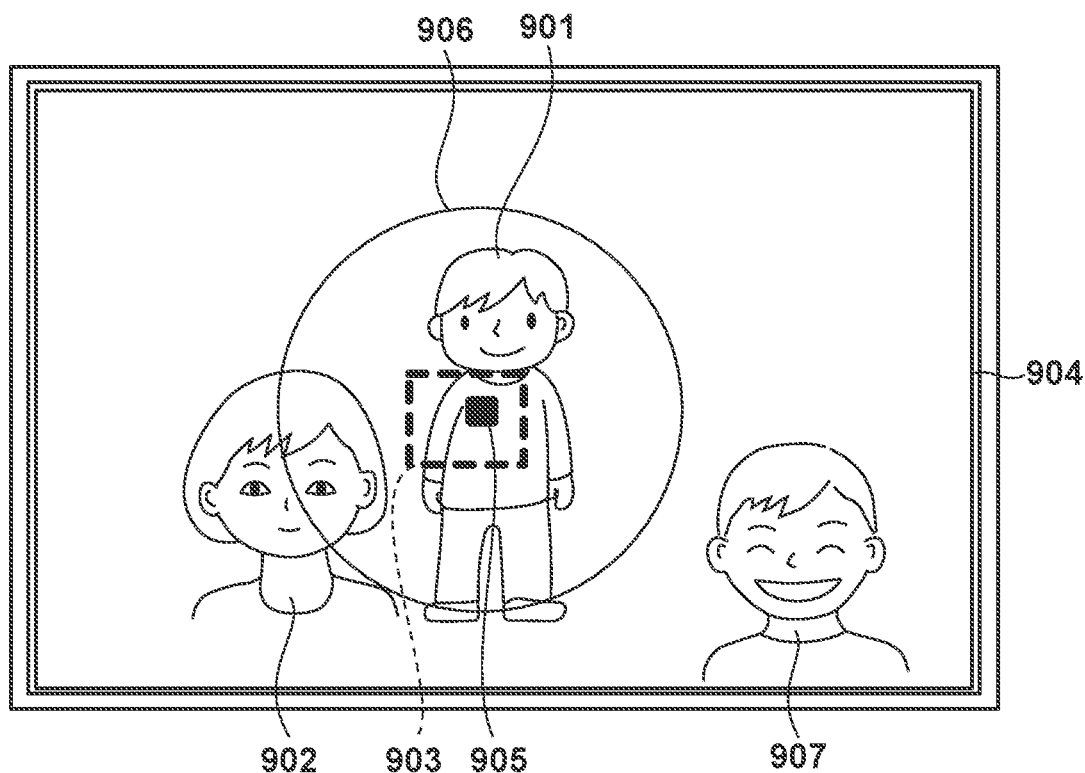
FIG. 9 is a diagram showing a specific example of main subject selection processing that is based on the AF position last time.

FIG. 9 is a diagram showing a specific example of main subject selection processing that is based on the AF position last time. FIG. 9 shows the case where the AF settings are changed such that the AF range is switched from an AF range 903 (AF range set before the AF settings were changed) shown with a dashed line to an AF range 904 shown with double lines. The user is aiming to implement AF control by switching the main subject to the face of a person 901 from a situation where AF control is performed with the part of the body of the person 901 within the AF range 903 as the main subject. In this case, it becomes possible to appropriate select the person 901 as the main subject rather than a person 902 with a larger face size who is in a vicinity of the center of the screen, by selecting the main subject in proximity to the AF position last time.

Figure 5:
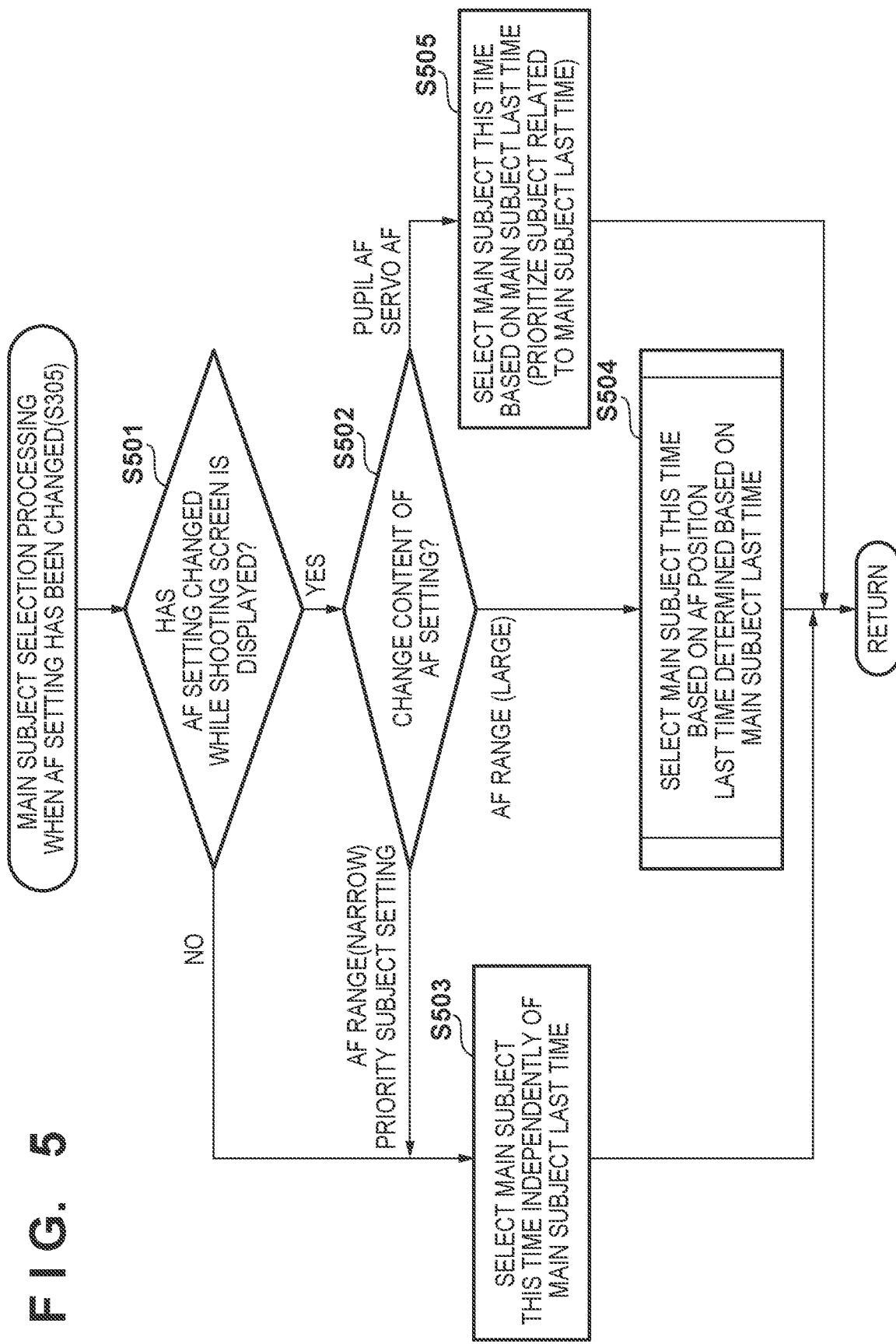
FIG. 5 is a flowchart showing details of main subject selection processing (step S305 of FIG. 3) for when the AF settings have been changed, according to a first embodiment.
Figure 8:
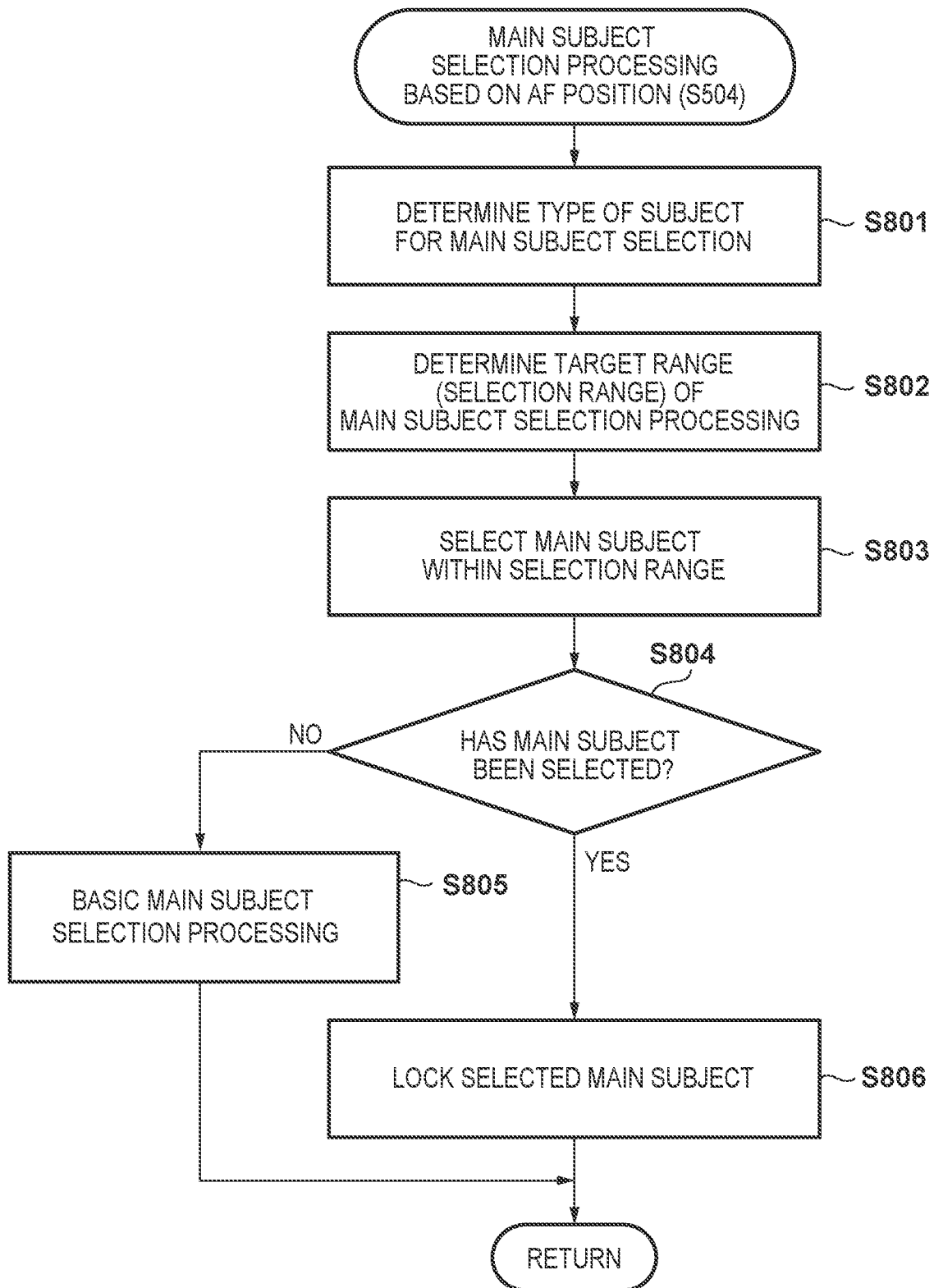
FIG. 8 is a flowchart showing details of main subject selection processing that is based on the AF position last time in step S504 of FIG. 5.

FIG. 8 is a flowchart showing details of the main subject selection processing that is based on the AF position last time in step S504 of FIG. 5. In step S801, the subject detection module 123 determines the type of subject to be targeted for main subject selection within proximity to the AF position set before the AF settings were changed. For example, the subject detection module 123 may determine, as the target, only a priority subject type (person, animal, etc.) that is based on the priority subject setting. Also, the subject detection module 123 may determine, as the target, the same type of subject as the type of main subject set before the AF settings were switched. Also, in relation to the case where part of the subject is tracked by object detection before the AF settings are switched, the subject detection module 123 may determine the priority subject type as the target.

Figure 10A:
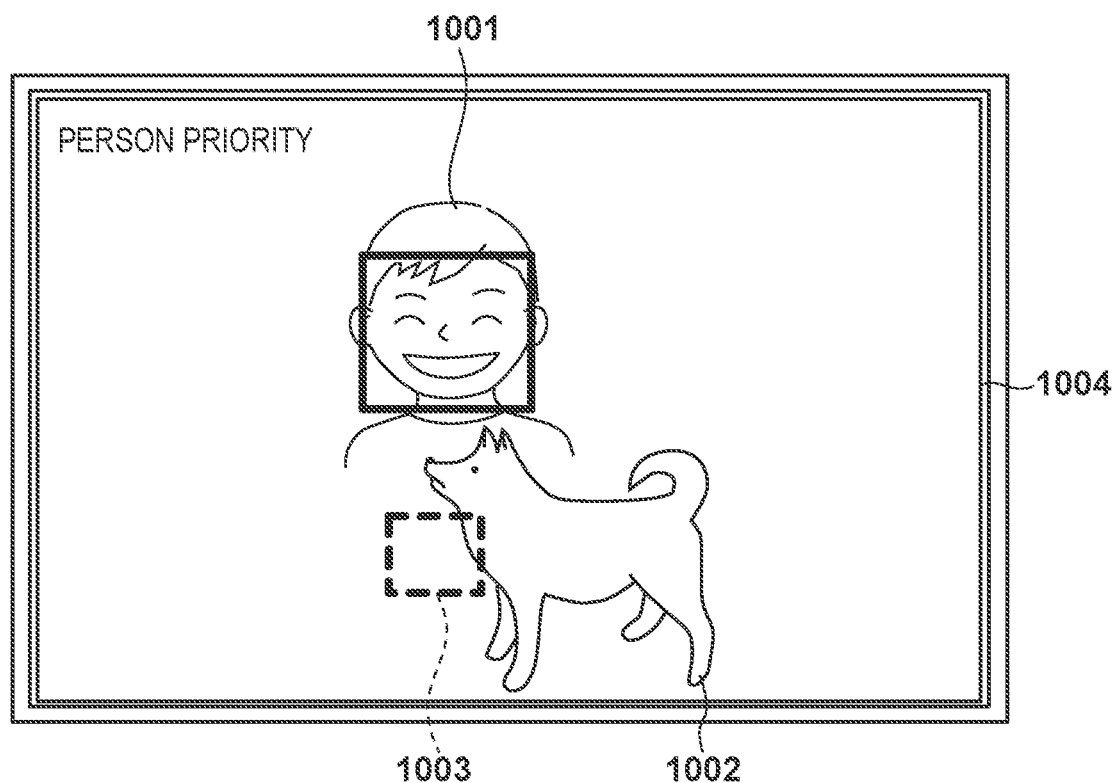
FIGS. 10A and 10B are diagrams showing a specific example of processing in step S801 of FIG. 8.
Figure 10B:
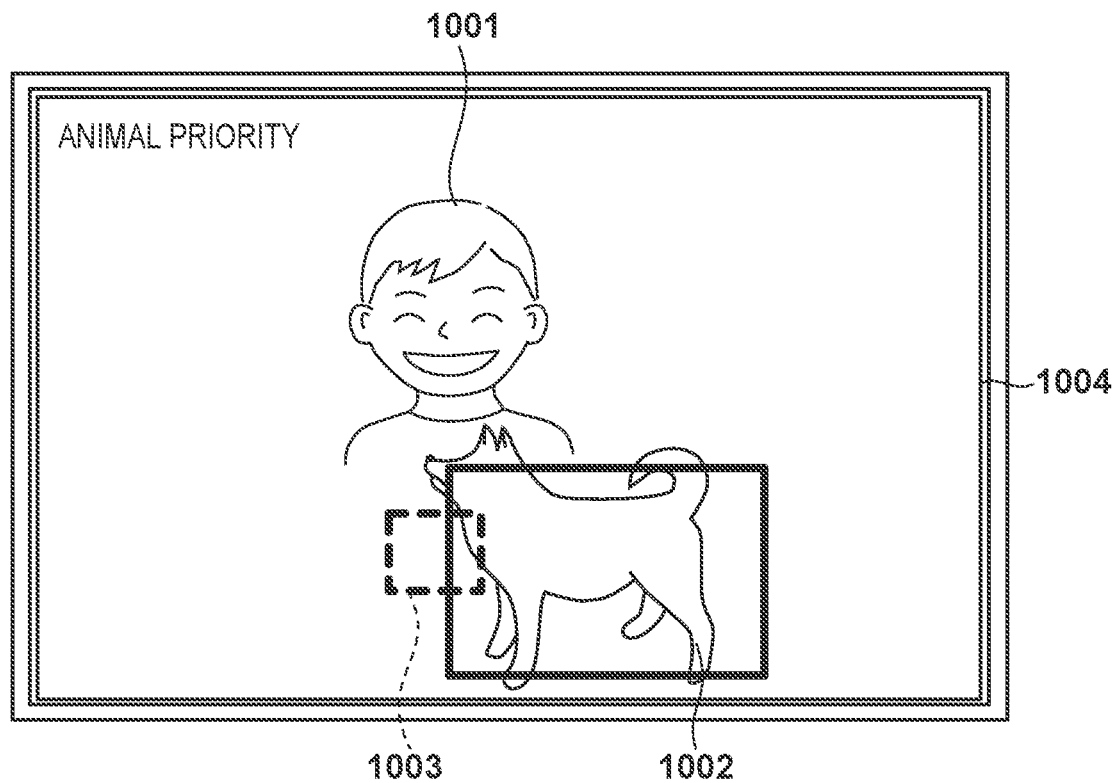

FIGS. 10A and 10B show a specific example of the processing in step S801. For example, in the scene of FIGS. 10A and 10B, a person 1001 and an animal 1002 are close together. In this scene, consider the case where the AF range is changed from an AF range 1003 in which parts of the bodies of the person 1001 and the animal 1002 overlap to an AF range 1004 of the entire region shown with double lines. In this case, if the priority subject type is person, it is assumed to be a scene in which the user wants to focus on the face of the person 1001 shown by a rectangle with a solid line as shown in FIG. 10A, and thus the person is determined as the target for main subject selection. Also, if the priority subject type is animal, it is assumed to be a scene in which the user wants to focus on the face of the animal 1002 shown by a rectangle with a solid line as shown in FIG. 10B, and thus the animal is determined as the target for main subject selection. In this way, the type of subject to be targeted for main subject selection within proximity to the AF position last time (AF position set before the AF settings were changed) is determined, such that the subject that the user focused on before the AF settings were switched can continue to be tracked.

In step S802, the subject detection module 123 determines the target range (hereinafter, selection range) of the main subject selection processing within proximity of the AF position set before the AF settings were switched (changed). Note that the AF range also prescribes a target range of the main subject selection processing similarly to the selection range, but, in the main subject selection processing that is based on the AF position last time, the selection range is preferentially used over the AF range. The selection range is, however, determined based on the AF range. For example, determining the selection range according to the size of the AF range after the AF settings have been switched (changed) enables the selection range of an appropriate size to be set according to the size of the AF range. The possibility of an unrelated subject being set as the main subject due to the selection range being too large or the possibility of not being able to select the subject that the user is targeting due to the selection range being too small can thereby be reduced.

Figure 11:
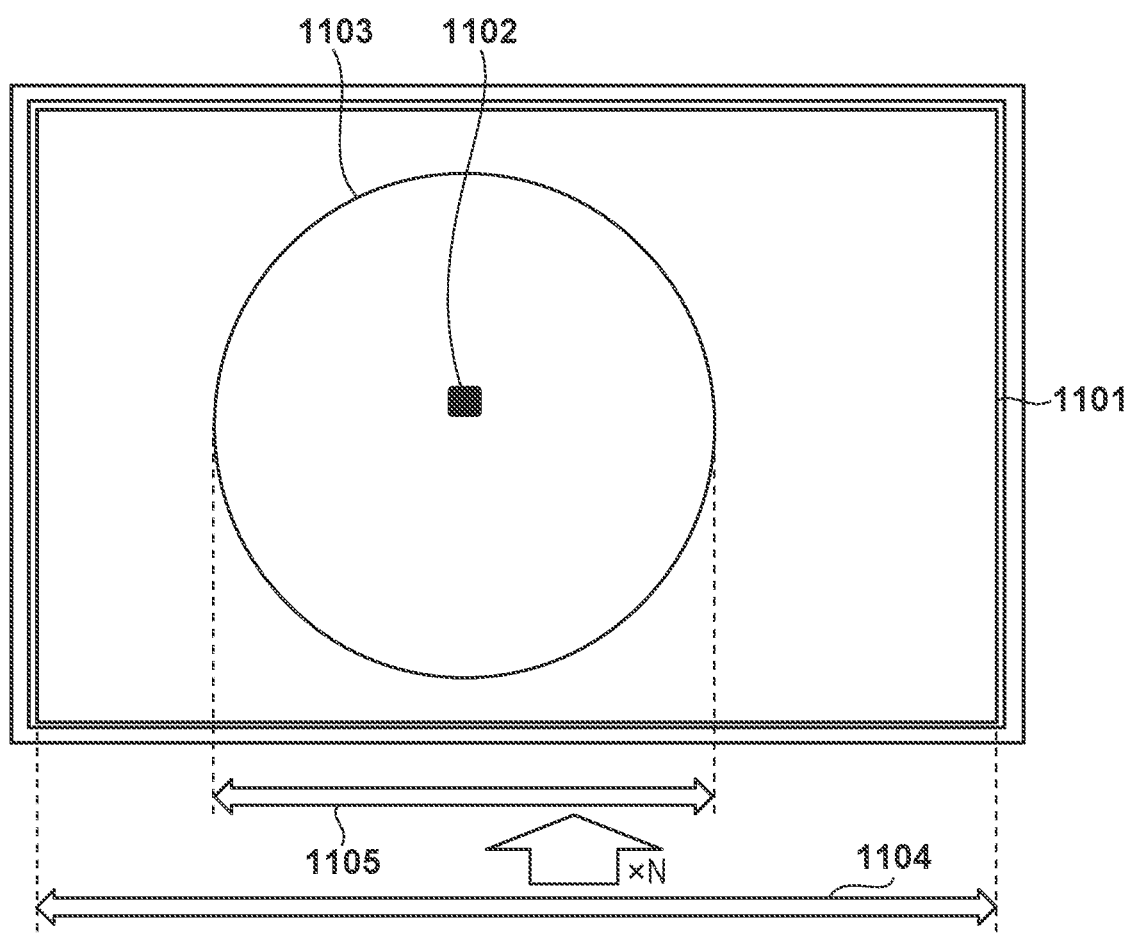
FIG. 11 is a diagram showing a specific example of selection range determination processing in step S802 of FIG. 8.

FIG. 11 is a diagram showing a specific example of the selection range determination processing in step S802. As shown in FIG. 11, a length obtained by multiplying a long side 1104 of an AF range 1101 shown by a rectangle with double lines that was set after the AF settings were switched by a prescribed coefficient N determined in advance may be taken as the length of a diameter 1105 of a selection range 1103 shown by a circle with a solid line. The center of the selection range 1103 is an AF position 1102 last time. Also, the selection range may be other shapes such as elliptical or rectangular rather than circular. Also, with regard to the setting of the selection range, a range in the depth direction centering on the AF position set before the AF settings were switched may be set as the selection range, in addition to a range within the screen.

In step S803, the subject detection module 123 selects the main subject from subjects detected within the selection range. Here, in the case where a plurality of subjects are detected within the selection range, the subject detection module 123 selects the subject closest to the AF position set before the AF settings were switched as the main subject. Also, the subject detection module 123 does not take subjects other than the type determined in step S801 as targets for main subject selection.

In the example of FIG. 9, a circular range shown with a solid line centering on an AF position 905 set before the AF settings were switched is set as a selection range 906. Here, the persons 901 and 902 are included in the selection range 906, but a person 907 is not included in the selection range 906, and thus the person 907 is not targeted for main subject selection. The person 901 included in the selection range 906 and closest to the AF position 905 set before the AF settings were switched is then selected as the main subject.

In step S804, the subject detection module 123 determines whether a main subject has been selected in step S803. If a main subject has been selected, the processing step advances to step S806. If a main subject has not been selected, the processing step advances to step S805.

The processing of step S805 is executed if a main subject cannot be selected within the selection range. This case is conceivably a scene in which the user wants to newly redetermine the main subject without regard for the main subject selected before the AF settings were switched. Thus, the system control unit 115 performs basic main subject selection processing similarly to step S304 of FIG. 3.

Figure 3:
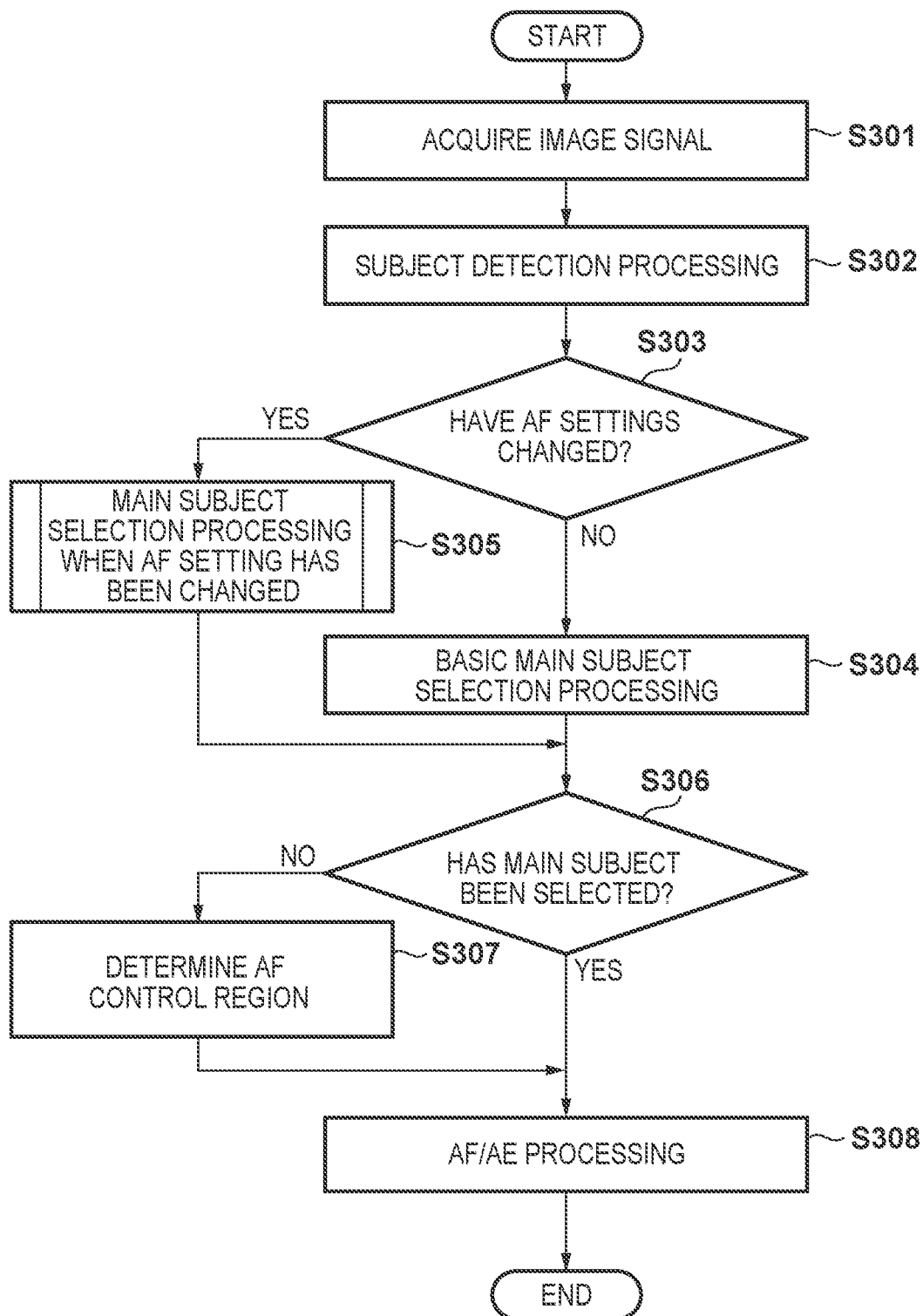
FIG. 3 is a flowchart of the overall operations of the image capturing apparatus 100.

Note that, in the case where a main subject has also not been selected in step S805, the processing step transitions from step S306 to step S307 in FIG. 3, and thus the processing for determining the AF control region is performed in step S307. At this time, in the case where the servo AF setting is enabled before and after the AF settings are switched, the user conceivably has a strong intent to track the subject selected before the AF settings were switched. In view of this, the AF processing unit 105 selects a position having high continuity with the AF position last time as the AF control region. Thereby, AF control that is in line with the intention of a user who also wants to continue tracking a subject selected before the AF settings were switched in scenes where subject detection cannot be performed, such as scenes where subject detection is difficult due to factors like the vigorous movement of the subject or where the user wants to perform AF tracking of a subject other than a detection target, is realized.

In step S806, the subject detection module 123 configures the settings such that the main subject does not shift to another subject (hereinafter, lock setting). Lock setting enables AF control that is in line with the intention of a user who wants to continue tracking a subject that he or she was targeting without switching the main subject to be realized, even if a subject with a higher priority than the main subject that was determined is detected after the AF settings were switched. Thereby, the person 901 can also be maintained as the main subject, without the main subject shifting to the person 902 with the larger face size, after the person 901 is selected as the main subject in FIG. 9. Also, the time for which the lock setting is continued may be set to a finite time that enables the user to carry out reframing and the like and achieve a stable composition. Thereby, the lock setting can be continued until the user has carried out reframing and switched to a composition in which the face of the person 901 is arranged in the center of the screen and the persons 902 and 907 are arranged at the edge of the screen, after selecting the person 901 as the main subject in FIG. 9. If a suitable composition with the person 901 as the main subject is achieved, the priority as the main subject increases, and thus maintaining the main subject with the lock setting is no longer necessary. Furthermore, after the lock setting is canceled at the finite time, it also becomes possible for the user to switch the main subject from the person 901 to another subject by intentionally switching the composition.

As described above, according to the first embodiment, the image capturing apparatus 100, in the case where the AF settings are changed after execution of the main subject selection processing last time, determines whether to execute the main subject selection processing this time based on the main subject last time or whether to perform the main subject selection processing this time independently of the main subject last time, according to the change content of the AF settings. The possibility of a main subject that is in line with the intention of the user being selected thereby improves.

Second Embodiment

The first embodiment described the main subject selection processing (step S305 of FIG. 3) for when the AF settings have been changed shown in FIG. 5. The second embodiment describes another example of the main subject selection processing for when the AF settings have been changed. In the second embodiment, the basic configuration of the image capturing apparatus 100 is similar to the first embodiment. Hereinafter, the description will focus on the differences from the first embodiment.

The operation unit 118 of the image capturing apparatus 100 is provided with one or more operation members (e.g., buttons) for changing the AF settings. The individual setting contents of the AF settings are associated with individual operation members of the one or more operation members. For example, enabling of the servo setting is associated with a first operation member, and enabling of the pupil AF setting is associated with a second operation member. In response to an individual operation member switching to an active state (e.g., button being pressed), the system control unit 115 changes the AF settings so as to reflect the setting content associated with this operation member. Also, in response to an individual operation member switching to an inactive state (e.g., pressed button being released), the system control unit 115 changes the AF settings so as to cancel reflection of the setting content associated with this operation member. For example, in the case where enabling of the servo setting is associated with a specific button, the system control unit 115 changes the AF settings so as to enable the servo setting when this button is pressed. Thereafter, when this pressed button is released, the system control unit 115 changes the AF settings so as to cancel enabling of the servo setting (so as to disable the servo setting). Furthermore, it is possible for the user to set the plurality of operation members to an active state at the same time, in which case, the setting contents associated with the respective operation members are reflected in the AF settings.

Figure 12:
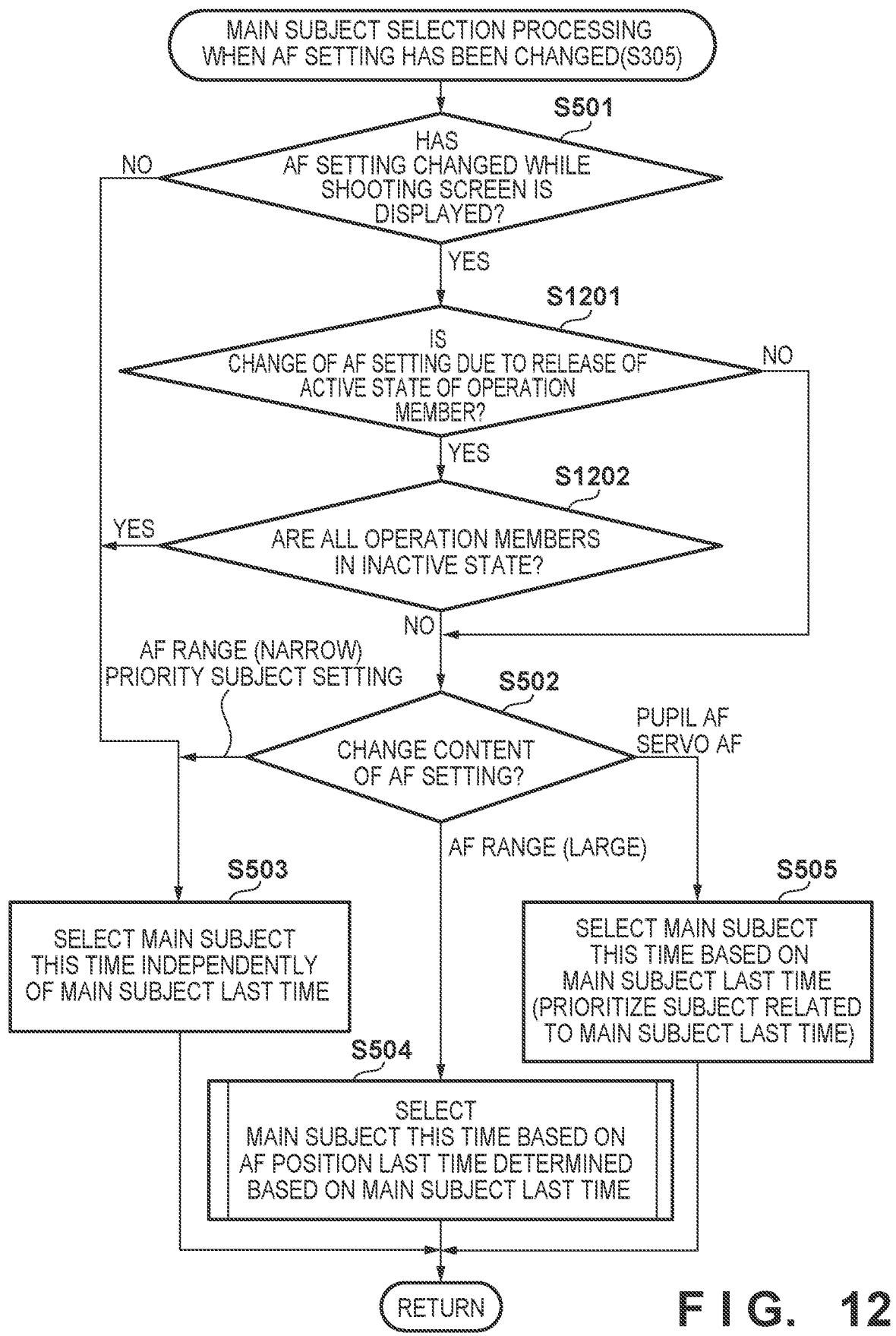
FIG. 12 is a flowchart showing details of main subject selection processing (step S305 of FIG. 3) for when the AF settings have been changed, according to a second embodiment.

FIG. 12 is a flowchart showing details of the main subject selection processing (step S305 of FIG. 3) for when the AF settings have been changed, according to the second embodiment. In the flowchart of FIG. 12, the same reference signs as FIG. 5 are given to steps in which processing that is same as or similar to FIG. 5 is performed.

In step S1201, the subject detection module 123 determines whether the change in the AF settings was due to the release of the active state (switching to the inactive state) of an operation member for changing the AF settings. If the change in the AF settings was due to the release of the active state, the processing step advances to step S1202, and if the change in the AF settings was not due to the release of the active state, the processing step advances to step S502.

In step S1202, the subject detection module 123 determines whether the AF settings returned to the initial state (whether all of the one or more operation members are in the inactive state). If the AF settings have returned to the initial state, the processing step advances to step S503, and if that is not the case, the processing step advances to step S502. Accordingly, in the case where the AF settings have changed in response to an individual operation member switching to the inactive state, and where all of the one or more operation members are in the inactive state, the main subject selection processing this time is executed independently of the main subject last time, regardless of the change content of the AF settings.

Here, the case where there are still setting contents that are enabled among the setting contents reflected in the AF settings by the operation members for changing the AF settings of the operation unit 118 is a state where the user continues operating the operation unit 118 while viewing the display unit 117. Accordingly, the user conceivably still has the intent to continue tracking the subject, and thus main subject selection processing that depends on the change content of the AF settings is performed (step S502). On the other hand, in the case where all the setting contents reflected by the operation members for changing the AF settings of the operation unit 118 are canceled, the user conceivably no longer has the intent to continue tracking the subject. Accordingly, the main subject selection processing this time is executed independently of the main subject last time, regardless of the change content of the AF settings (step S503).

FIGS. 13A to 13E are diagrams showing a specific example of main subject selection processing for when the AF settings have been changed, according to the second embodiment. In the example of FIGS. 13A to 13E, the servo AF setting and the pupil AF setting are respectively registered to a physical button A and a physical button B that are included in the operation unit 118. The servo AF setting and the pupil AF setting are then respectively enabled when the user presses the physical buttons A and B, and the servo AF setting and the pupil AF are respectively disabled when the user releases the physical buttons A and B.

Figure 13A:
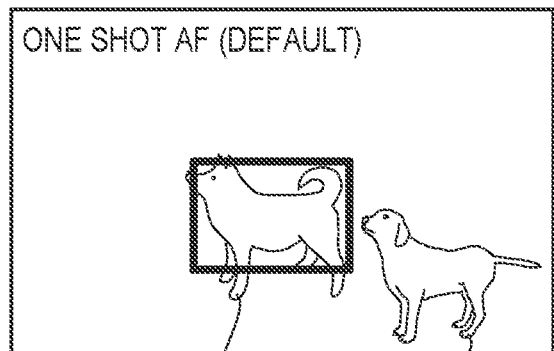
FIGS. 13A to 13E are diagrams showing a specific example of main subject selection processing for when the AF settings have been changed, according to the second embodiment.
Figure 13B:
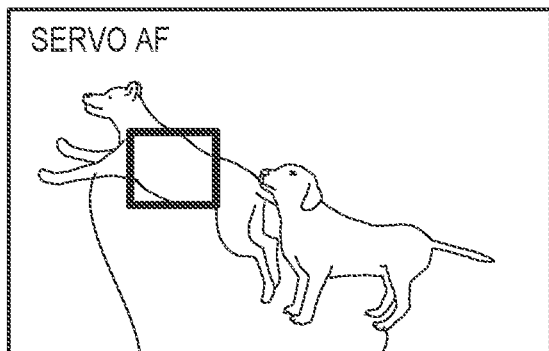
Figure 13C:
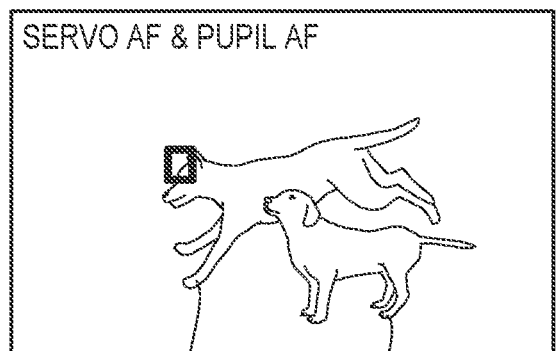
Figure 13D:
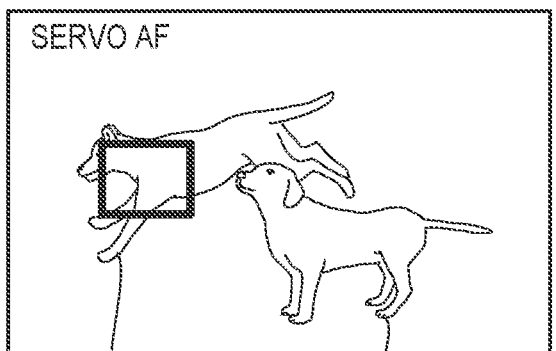
Figure 13E:
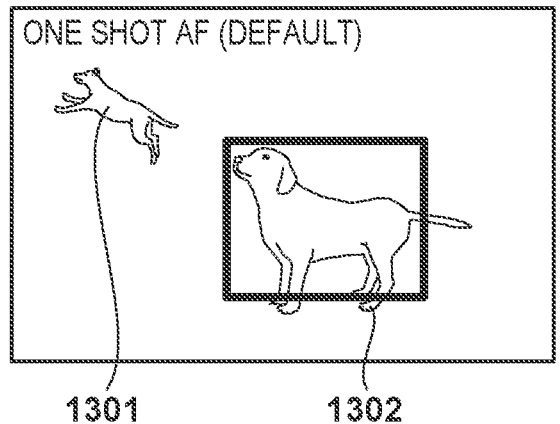

FIG. 13A shows a state where the physical buttons A and B are both not pressed. In this state, the one shot setting is enabled and a stationary animal 1301 shown by a rectangle with a solid line is selected as the main subject. In FIG. 13B, the animal 1301 has started moving, and thus the user presses the physical button A and enables the servo setting. In this case, the animal 1301 continues to be selected as the main subject, based on the main subject set before the AF settings were switched. Next, in FIG. 13C, the user presses the physical button B and enables the pupil AF setting. Similarly in this case, the pupil of the animal 1301 which was the main subject before the AF settings were switched is selected as the main subject this time, rather than an animal 1302 that is in the center of the screen. In FIG. 13D, the user cancels (disables) the pupil AF setting by releasing the physical button B, but since the physical button A is still being pressed, the user still has the intent to continue tracking the original main subject with the servo AF. Thus, the animal 1301 corresponding to the pupil which was the main subject last time is selected as the main subject. In FIG. 13E, all of the setting contents by the operation members for changing the AF settings are canceled, by the user releasing the physical button A, and thus the AF settings return to the initial state. Thus, it is assumed that the user has the intent to reset the AF settings and redo the main subject selection. Accordingly, the main subject selection processing this time is performed independently of the main subject last time, and the animal 1302 in the center of the screen is selected as the main subject.

As described above, according to the second embodiment, the image capturing apparatus 100 executes the main subject selection processing this time independently of the main subject last time, regardless of the change content of the AF settings, in the case where the AF settings have been changed in response to the individual operation member having been switched to the inactive state, and where all of the one or more operation members are in the inactive state. The possibility that a main subject in line with the intention of the user is selected thereby improves.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-079556, filed Apr. 28, 2020, which is hereby incorporated by reference herein in its entirety.

What is claimed is:

1. A focus adjustment apparatus comprising at least one processor which functions as:
   a selection unit configured to repeatedly execute selection processing for selecting a main subject from one or more subjects included in a shooting range based on an autofocus (AF) setting;
   a focus adjustment unit configured to perform a focus adjustment on a target position determined based on the selected main subject; and
   a change unit configured to change the AF setting,
   wherein, in a case where the AF setting is changed after a previous execution of selection processing, the selection unit determines whether to execute selection processing based on the main subject selected in the previous execution of selection processing or whether to execute the selection processing independently of the main subject selected in the previous execution of selection processing, according to a change content of the AF setting.

2. The focus adjustment apparatus according to claim 1, wherein the AF setting includes a setting item for prescribing a priority subject type indicating a type of subject to be preferentially selected in the selection processing, and
   in a case where the AF setting is changed so as to change the priority subject type, the selection unit executes the selection processing independently of the main subject selected in the previous execution of selection processing.

3. The focus adjustment apparatus according to claim 2, wherein, even if the AF setting is changed so as to change the priority subject type, the selection unit executes the selection processing based on the main subject selected in the previous execution of selection processing in a case where the priority subject type set before the change or after the change is pupil.

4. The focus adjustment apparatus according to claim 1,
   wherein the AF setting includes a setting item for prescribing whether the focus adjustment by the focus adjustment unit is to be performed only once or continuously repeated in response to one focus adjustment instruction by a user, and
   in a case where the AF setting is changed so as to continuously repeat the focus adjustment by the focus adjustment unit in response to the one focus adjustment instruction, the selection unit executes the selection processing based on the main subject selected in the previous execution of selection processing.

5. The focus adjustment apparatus according to claim 1,
   wherein the AF setting includes a setting item for prescribing a target range of the selection processing within the shooting range, and
   in a case where the AF setting is changed so as to reduce the target range, the selection unit executes the selection processing independently of the main subject selected in the previous execution of selection processing.

6. The focus adjustment apparatus according to claim 5, wherein in a case where the AF setting is changed so as to enlarge the target range, the selection unit executes the selection processing based on the target position determined based on the main subject selected in the previous execution of selection processing.

7. The focus adjustment apparatus according to claim 6, wherein executing the selection processing based on the target position determined based on the main subject selected in the previous execution of selection processing includes restricting the target range of the selection processing within a prescribed range from the target position.

8. The focus adjustment apparatus according to claim 7, wherein the prescribed range is determined based on a size of the target range prescribed by the AF setting.

9. The focus adjustment apparatus according to claim 1,
   wherein the AF setting includes a setting item for prescribing a target range of the selection processing within the shooting range, and
   in a case where the AF setting is changed so as to enlarge the target range, the selection unit executes the selection processing based on the target position determined based on the main subject selected in the previous execution of selection processing.

10. The focus adjustment apparatus according to claim 1, further comprising:
    one or more operation members,
    wherein individual setting contents of the AF setting are associated with individual operation members of the one or more operation members,
    the change unit is configured to change the AF setting, in response to an individual operation member of the one or more operation members switching to an active state, so as to reflect a setting content associated with the individual operation member, and to change the AF setting, in response to the individual operation member switching to an inactive state, so as to cancel reflection of the setting content associated with the individual operation member, and
    in a case where the AF setting is changed in response to an individual operation member of the one or more operation members switching to an inactive state, and where all of the one or more operation members are in an inactive state, the selection unit executes the selection processing independently of the main subject selected in the previous execution of selection processing, regardless of the change content of the AF setting.

11. The focus adjustment apparatus according to claim 1, wherein the at least one processor and/or at least one circuit further functions as:
    a display control unit configured to control whether to display an image of the shooting range on a display,
    wherein, in a case where the AF setting is changed in a state where the image of the shooting range is not displayed on the display, the selection unit executes the selection processing independently of the main subject selected in the previous execution of selection processing regardless of the change content of the AF setting.

12. An image capturing apparatus comprising:
    the focus adjustment apparatus according to claim 1; and
    an image sensor.

13. A focus adjustment method executed by a focus adjustment apparatus, comprising:
    repeatedly executing a selection processing for selecting a main subject from one or more subjects included in a shooting range based on an autofocus (AF) setting;

performing a focus adjustment on a target position determined based on the selected main subject;

changing the AF setting; and in a case where the AF setting is changed after an previous execution of selection processing, determining whether to execute selection processing based on the main subject selected in the previous execution of selection processing or whether to execute the selection processing this time independently of the main subject selected in the previous execution of selection processing according to a change content of the AF setting.

14. A non-transitory computer-readable storage medium which stores a program for causing a computer to execute a focus adjustment method comprising:

repeatedly executing a selection processing for selecting a main subject from one or more subjects included in a shooting range based on an autofocus (AF) setting;

performing a focus adjustment on a target position determined based on the selected main subject;

changing the AF setting; and in a case where the AF setting is changed after a previous execution of selection processing, determining whether to execute selection processing based on a main subject selected in the previous execution of selection processing or whether to execute the selection processing independently of the main subject selected in the previous execution of selection processing according to a change content of the AF setting.

15. A focus adjustment apparatus comprising at least one processor which functions as:

a selection unit configured to repeatedly execute selection processing for selecting a main subject from one or more subjects included in a shooting range based on an autofocus (AF) setting;

a focus adjustment unit configured to perform a focus adjustment on a target position determined based on the selected main subject; and a change unit configured to change the AF setting, wherein, in a case where the AF setting is changed after an execution of a first selection processing, the selection unit determines whether to execute a second selection processing based on the main subject selected in the first selection processing or whether to execute the second selection processing independently of the main subject selected in the first selection processing, according to a change content of the AF setting.

16. The focus adjustment apparatus according to claim 15, wherein the selection unit determines whether to execute the second selection processing based on the main subject selected in the first selection processing or whether to execute the second selection processing independently of the main subject selected in the first selection processing, according to a relationship of AF setting contents before and after change.

* * * * *